United States Patent
Kimura et al.

(10) Patent No.: US 7,486,170 B2
(45) Date of Patent: Feb. 3, 2009

(54) VEHICLE ANTITHEFT DEVICE

(75) Inventors: Takuma Kimura, Hyogo (JP); Toshiaki Hata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 587 days.

(21) Appl. No.: 11/136,379

(22) Filed: May 25, 2005

(65) Prior Publication Data
US 2006/0109081 A1 May 25, 2006

(30) Foreign Application Priority Data
Nov. 24, 2004 (JP) ............................ 2004-338888

(51) Int. Cl.
*H04Q 9/00* (2006.01)
(52) U.S. Cl. ..................... 340/5.72; 340/5.1; 340/5.2; 340/5.7; 340/10.1; 340/5.6
(58) Field of Classification Search ............... 340/5.73, 340/5.1, 5.2, 5.7, 10.1, 5.6, 5.64
See application file for complete search history.

(56) References Cited

U.S. PATENT DOCUMENTS
5,006,843 A * 4/1991 Hauer ...................... 340/5.28

FOREIGN PATENT DOCUMENTS
JP       2001-206199 A       7/2001

OTHER PUBLICATIONS
Honda Forza-X Instruction Manual, Apr. 4, 2004, Honda Motor Co., Ltd., pp. 1-5, 32-35.

* cited by examiner

*Primary Examiner*—Brian A Zimmerman
*Assistant Examiner*—Vernal U Brown
(74) *Attorney, Agent, or Firm*—Sughrue Mion, PLLC

(57) ABSTRACT

A remedial unit in a vehicle antitheft device capable of performing starting control according to an authentication result derived from radio communication between a portable unit and an onboard unit, with great security regarding permission to start the vehicle when the portable unit cannot be used, the onboard unit including: a unit detecting that terminals of a predetermined electric wiring outside the onboard unit are connected by a connecting element; a unit detecting a predetermined signal indicating that a key cylinder outside the onboard unit is at a predetermined position; a unit detecting a signal generated by a password manual entry switch outside the onboard unit; and a unit generating a starting control command to a vehicle drive control unit when a predetermined password is entered after conductiveness of the electric wiring and occupation of the predetermined position by the mechanical key have been detected by the units.

7 Claims, 5 Drawing Sheets

VEHICLE ANTITHEFT DEVICE

BACKGROUND OF THE INVENTION

1. Field of the Invention

The present invention relates to a vehicle antitheft device performing an authentication processing through radio communication between a portable unit and an onboard unit and enabling the starting of a vehicle upon fulfillment of authentication, and more particularly to a remedial means for starting the vehicle when the portable unit runs out of electric charge, breaks down, or goes astray.

2. Description of the Related Art

Conventionally, there is a vehicle antitheft device performing an authentication processing through radio communication between a portable unit carried by a driver and an onboard unit installed in a vehicle and permitting the vehicle to start upon fulfillment of authentication (e.g., as disclosed in JP 2001-206199 A).

In the case of a vehicle antitheft device as mentioned above, if a portable unit becomes unusable by, for example, running out of electric charge, breaking down, or going astray, the vehicle concerned cannot be started. As a countermeasure against such a case, there is a vehicle antitheft device including the following remedial means. If a portable unit becomes unusable, an emergency password mode is entered by connecting an emergency coupler attached to the vehicle to a predetermined wiring in the vehicle. Then, a user enters a password of a predetermined digit number through switch entry from the vehicle. If the password coincides with a preset one, it is possible to start an engine of the vehicle.

However, in spite of the intention to enhance security as a vehicle antitheft device, this remedial means, which allows a password entry mode to be entered by simply connecting the coupler when the portable unit cannot be used, causes a deterioration in security. In some conventional cases as well, the coupler is stored in a box locked by a mechanical key mechanism. However, since the box can be pried open by, for example, destroying the mechanical key mechanism, it is possible to connect the coupler and induce a password entry mode.

SUMMARY OF THE INVENTION

The present invention has been made to solve the problems discussed above. It is an object of the present invention to provide a vehicle antitheft device relating to permission to start a vehicle when a portable unit cannot be used and including a remedial means achieving a further improvement in security.

The present invention provides a vehicle antitheft device including a portable unit and an onboard unit for performing an authentication processing through radio communication between the portable unit and the onboard unit and issuing a starting control command to the side of a vehicle drive control unit upon fulfillment of authentication. In the vehicle antitheft device, with a view to starting the vehicle without using the portable unit, the onboard unit includes: wiring conductiveness detecting section for detecting that terminals of a predetermined electric wiring outside the onboard unit have been connected and made conductive by a connecting element; and mechanical key position detecting section for detecting a predetermined signal from a mechanical key mechanism outside the onboard unit, the mechanical key mechanism generating the predetermined signal when a mechanical key has been inserted into a key cylinder and assumes a predetermined position. Also, the onboard unit includes: password detecting section for detecting a signal generated through operation of a password manual entry switch outside the onboard unit; and starting control command generating section for generating a starting control command to the side of the vehicle drive control unit when a predetermined password is entered after conductiveness of the predetermined electric wiring and occupation of the predetermined position by the mechanical key have been detected as a result of detection carried out by the wiring conductiveness detecting section, the mechanical key position detecting section, and the password detecting section.

By combining a specific plug, a mechanical key mechanism, and a manually entered password, the present invention can provide a remedial means achieving a further improvement in security with regard to permission to start a vehicle when a portable unit cannot be used.

DETAILED DESCRIPTION OF THE PREFERRED EMBODIMENT

First Embodiment

Figure 1:
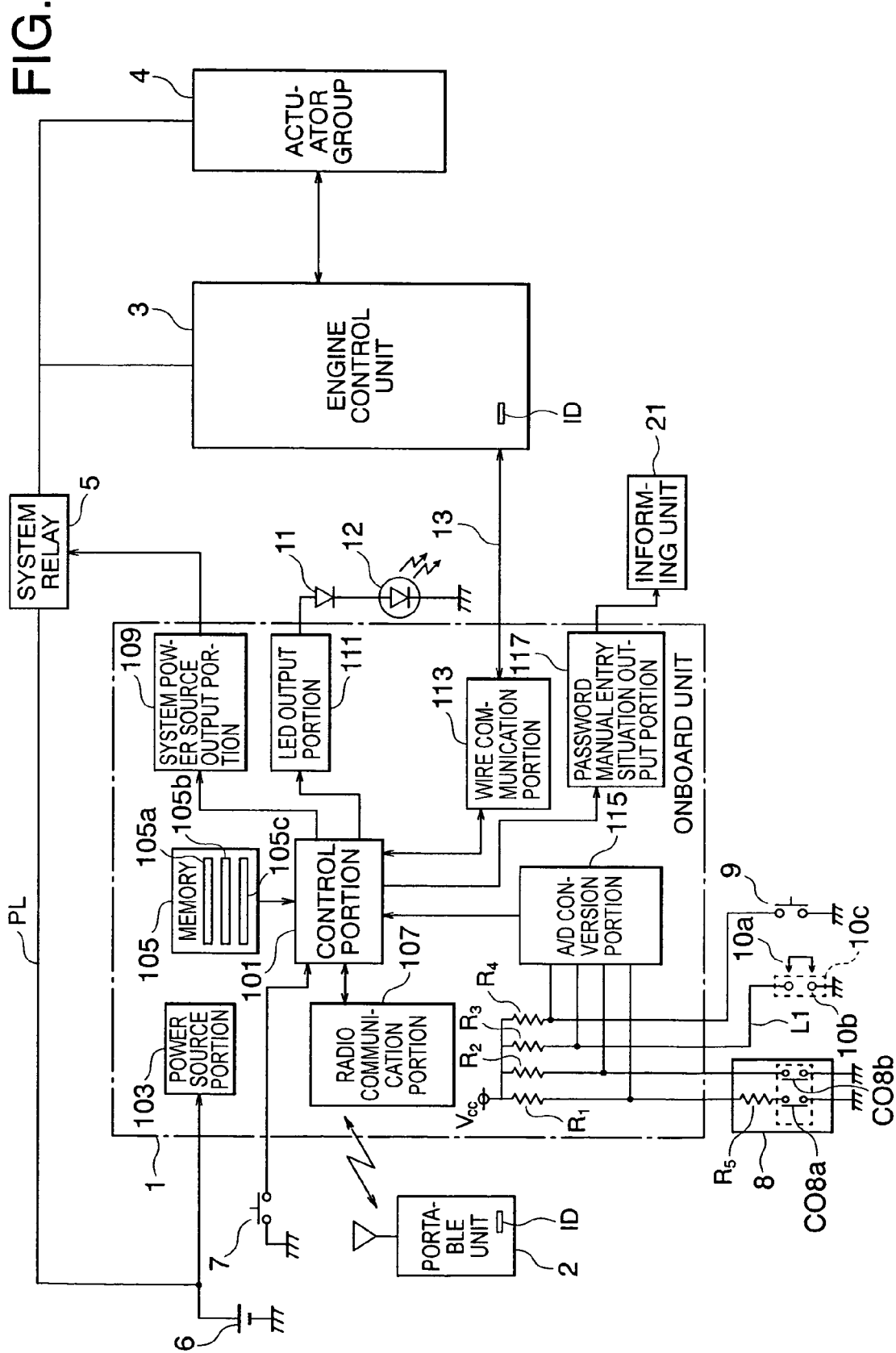
FIG. 1 shows the construction of a vehicle antitheft device according to one embodiment of the present invention.

FIG. 1 shows the construction of a vehicle antitheft device according to one embodiment of the present invention. An onboard unit 1, an engine control unit (ECU) 3, and an actuator group 4 composed of various actuators such as an ignition coil, injectors, and a fuel pump (not shown) are supplied with power from a battery 6 via a power line PL. A system relay 5 is turned ON in response to a starting control command from the onboard unit 1 as soon as a predetermined condition is fulfilled in the onboard unit 1, whereby the engine control unit (ECU) 3 and the actuator group 4 are supplied with power.

In the onboard unit 1, a power source portion 103 is supplied with power from the battery 6. When a driver operates an operational switch 7 provided on the side of the vehicle, a radio communication portion 107 establishes radio communication with a portable unit 2 carried by a user of the vehicle, requests an ID from the portable unit 2 for the purpose of ID collation, and obtains the ID. An A/D conversion portion 115 converts analog signals obtained from and indicating states of a key cylinder 8, an electric wiring L1, and a password manual entry switch 9, which are respectively provided on the side of the vehicle as will be described later, into digital signals. Stored in a memory 105 are predetermined ID data 105a for ID collation with the portable unit 2, predetermined ID data 105b for ID collation with the engine control unit 3, a predetermined password 105c to be entered from the password manual entry switch 9, and the like.

When a predetermined condition is fulfilled in the onboard unit 1, a system power source output portion 109 issues a starting control command to turn ON the system relay 5 across which the power line PL extends. An LED output portion 111 outputs a password manual entry assist output, which is intended to cause a light-emitting diode (LED) 12 to emit light on a predetermined cycle for the sake of a password entry operation of the password manual entry switch 9, to the LED 12 via a diode 11 for backflow prevention. After the system relay 5 has been turned ON, a wire communication portion 113 establishes wire communication with the engine control unit 3 via a communication line 13, and then performs ID collation and the like with the engine control unit 3 using the ID data 105b. If ID collation results in coincidence, the actuator group 4 is actuated through control of the engine control unit 3 so that the engine is driven. A password manual entry situation output portion 117 outputs a signal for displaying or sounding out a password manual entry situation to an informing unit 21 constructed as a display or audio equipment. A control portion 101 made up of a computer controls those components and performs the control of a starting operation with the aid of the portable unit 2 or the password manual entry switch 9.

Formed between the onboard unit 1 and each of the key cylinder 8, the electric wiring L1 fitted with a connector 10c, and the password manual entry switch 9 is a circuit, which is designed to constitute a signal line for inputting a signal indicating the state of each of the components to the A/D conversion portion 115 as an analog signal. The signal line to which a contact CO8a of the key cylinder 8 is connected includes a resistance $R_1$ on the side of the onboard unit 1 and a resistance $R_5$ on the side of the key cylinder 8. The signal line to which a contact CO8b of the key cylinder 8 is connected includes a resistance $R_2$ on the side of the onboard unit 1. The signal line to which the electric wiring L1 fitted with the connector 10c is connected includes a resistance $R_3$ on the side of the onboard unit 1. The signal line to which the password manual entry switch 9 is connected includes a resistance $R_4$ on the side of the onboard unit 1. A signal voltage setting circuit that sets voltages of the signals indicating the respective states is constituted by the resistances $R_1$ to $R_5$ and the signal lines extending across them. Thus, part (the resistance $R_5$) of the signal voltage setting circuit is formed in the key cylinder 8 of a mechanical key mechanism 800.

Figure 2:
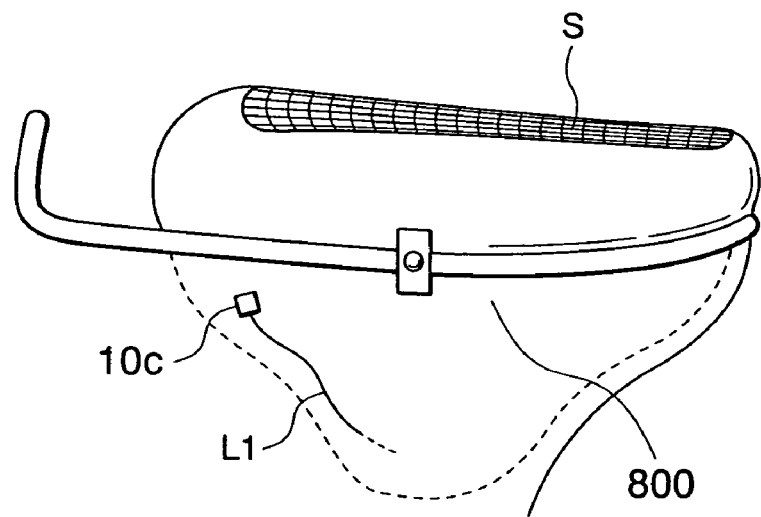
FIG. 2 shows an exemplary location where an electric wiring provided with a connector to which a coupler of the present invention is connected is arranged.
Figure 3:
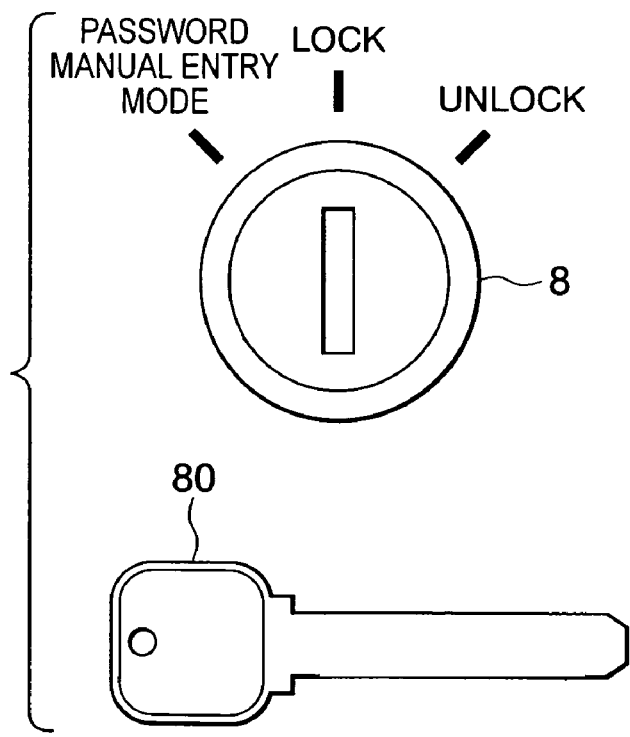
FIG. 3 shows an example of a key cylinder and a mechanical key which constitute a mechanical key mechanism of the present invention.

FIG. 2 shows a seat portion of, for example, a two-wheeled vehicle. A seat S, which is openable and closable because a region below it constitutes a storage space for storing a helmet and other instruments, is provided with the mechanical key mechanism 800 for security. The key cylinder 8 in FIG. 1 is composed of, for example, components constituting the mechanical key mechanism 800. The mechanical key mechanism 800 is constituted by, for example, inserting one and only mechanical key 80 shown in FIG. 3, which is possessed by the driver, into a key hole of the key cylinder 8 shown in FIG. 3. By turning the mechanical key 80, a switch to a lock position (normal position) for locking the seat S, an unlock position for unlocking the seat S, or a password manual entry mode position for allowing a password to be manually entered by means of the password manual entry switch 9 is made.

The key cylinder 8 has the contacts CO8a, CO8b as shown in FIG. 1, which are designed to be closed when the key cylinder 8 is at the password manual entry mode position. When the contacts CO8a, CO8b are closed, a signal at a level obtained by dividing a voltage $V_{cc}$ according to a ratio between the resistance $R_1$ on the side of the onboard unit 1 and the resistance $R_5$ on the side of the key cylinder 8 is input to the A/D conversion portion 115 through the signal line on the side of the contact CO8a, and a signal at a ground level is input to the A/D conversion portion 115 through the signal line on the side of the contact CO8b.

The electric wiring L1 fitted with the connector 10c is provided in the storage space below the seat S locked by the mechanical key mechanism 800 shown in FIG. 2. As shown in FIG. 1, the connector 10c of this electric wiring L1 includes two terminals 10b that are electrically separated from each other so as to divide the electric wiring L1. For instance, if the driver wants to manually enter a password, a coupler 10a as a connecting element is coupled to the connector 10c. Both the terminals 10b are thereby electrically connected and become conductive. With the coupler 10a coupled to the connector 10c, a signal at the ground level is input to the A/D conversion portion 115. Further, when the password manual entry switch 9 is ON, a signal at the ground level is input to the A/D conversion portion 115 from the signal line provided with the password manual entry switch 9.

The side of the vehicle drive control unit is composed of the system relay 5, the engine control unit 3, and the actuator group 4. The wiring conductiveness detecting section is composed of the signal line extending across the resistance $R_3$, the A/D conversion portion 115, and the control portion 101. The mechanical key position detecting section is composed of the signal line extending across the resistances $R_1$, $R_2$, $R_5$, the A/D conversion portion 115, and the control portion 101. The password detecting section is composed of the signal line extending across the resistance $R_4$, the A/D conversion portion 115, and the control portion 101. The starting control command generating section is composed of the control portion 101 and the system power source output portion 109. The starting control command is designed as a signal that is output from the system power source output portion 109 to turn the system relay 5 ON. The signal voltage setting circuit is composed of the resistances $R_1$ to $R_5$ and the signal lines extending across them. The password manual entry assist output generating section is composed of the control portion 101, the LED output portion 111, the diode 11, and the LED 12, or of the control portion 101, the password manual entry assist signal output portion 111a, and a password manual entry assist output generating portion 12a. The password manual entry situation informing section is composed of the control portion 101, the password manual entry situation output portion 117, and the informing unit 21.

Figure 4:
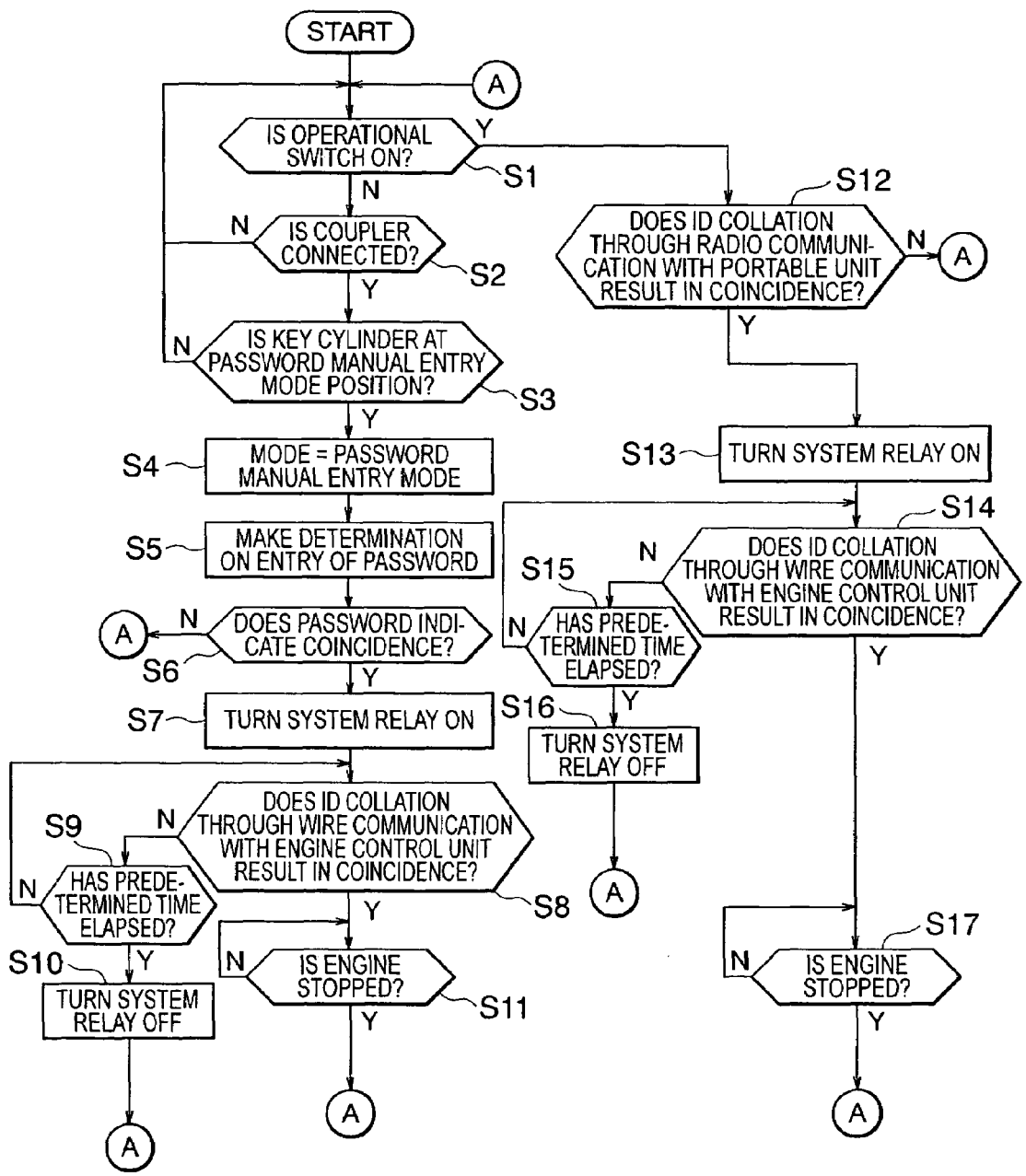
FIG. 4 is a flowchart for explaining the operation of the vehicle antitheft device according to the present invention.

FIG. 4 shows a flowchart of the operation of the vehicle antitheft device according to the present invention. An explanation of the operation will be described below with reference to this flowchart. For instance, if the driver turns the operational switch 7 ON through a press (step S1), it is determined that a normal mode has been entered, and starting control is performed through an authentication processing based on radio communication with the portable unit 2. However, it will be first described herein how starting control is performed when the portable unit 2 constituting the feature of the present invention cannot be used.

When the portable unit 2 cannot be used, the driver inserts the mechanical key 80 held by his or her own hand into the key cylinder 8 of the mechanical key mechanism 800 shown in FIG. 2, turns the mechanical key 80 to the unlock position (see FIG. 3) to unlock the mechanical key mechanism 800, and opens the seat S. The driver then couples the coupler 10a held by his or her own hand or stored somewhere in the vehicle to the connector 10c of the electric wiring L1 which is provided in, for example, the storage space below the seat S. The level of the signal line connected to the electric wiring L1 thereby becomes equal to the ground level. In addition, the driver sets the key cylinder 8 at the password manual entry mode position shown in FIG. 3. Since the contacts CO8a, CO8b in FIG. 1 are thereby closed, the level of the signal line on the side of the contact CO8a becomes equal to the voltage level obtained by dividing the voltage $V_{cc}$ according to the ratio between the resistances $R_1$, $R_5$, and the level of the signal line on the side of the contact CO8b becomes equal to the ground level.

In the control portion 101 of the onboard unit 1, if it is confirmed from signals obtained by subjecting those of the aforementioned respective signal lines to A/D conversion in the A/D conversion portion 115 that the coupler 10a has been connected to the connector 10c of the electric wiring L1 (step S2) and that the key cylinder 8 is at the password manual entry mode position (step S3), it is determined that the password manual entry mode has been entered (step S4). A determination on the entry of a password is then made from a signal input through the driver's operation of the password manual entry switch 9 (step S5). Signals obtained in the A/D conversion portion 115 are subjected to noise reduction. This noise reduction is carried out by, for example, ignoring a digital signal obtained through A/D conversion whose duration is equal to or shorter than a predetermined time in a software processing of the control portion 101 or providing a low-pass filter (not shown) as an electric circuit for analog signals that have not undergone A/D conversion yet.

Figure 5:
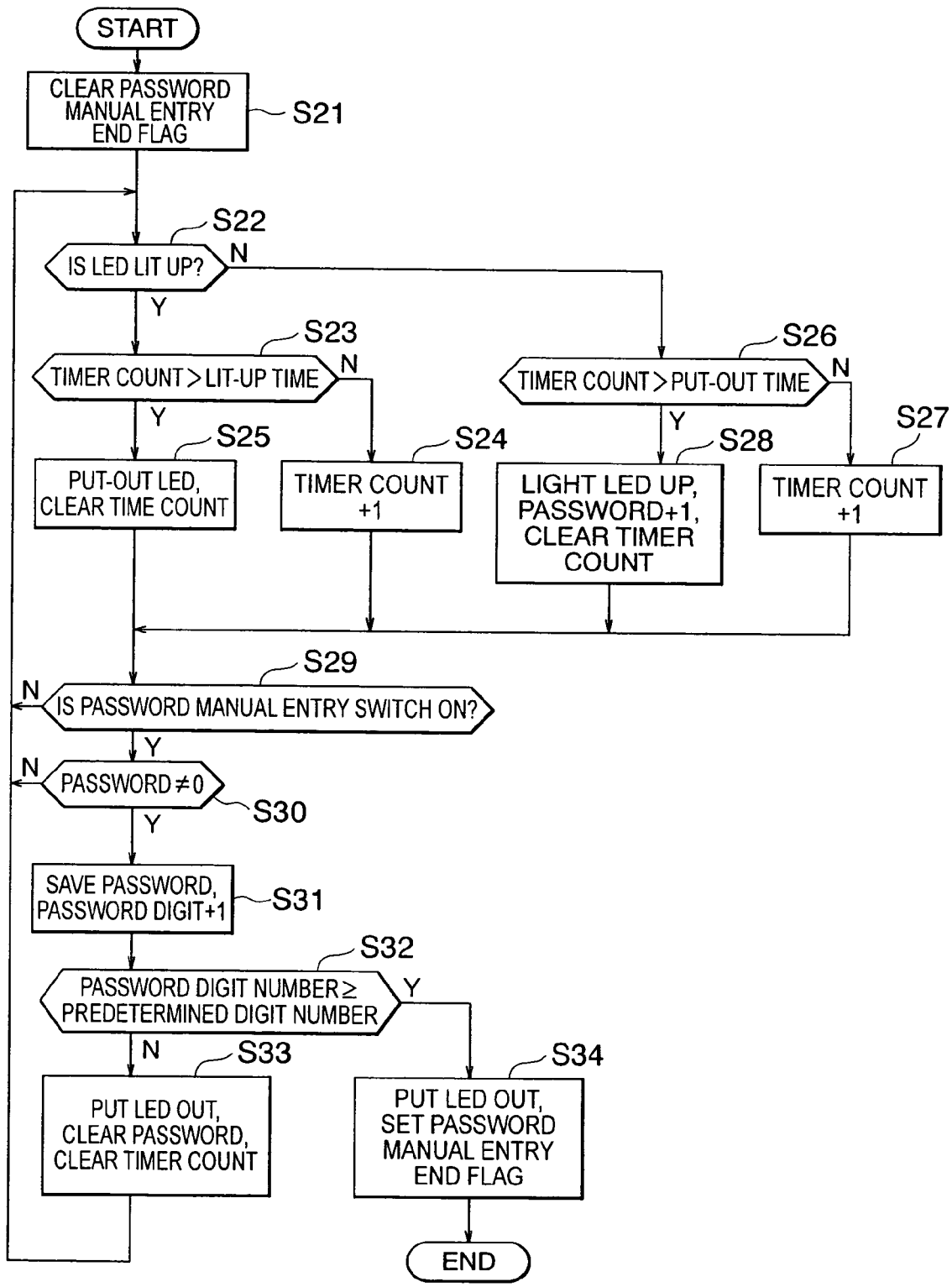
FIG. 5 is a flowchart for explaining the operation at the time when a password is manually entered in FIG. 4.

FIG. 5 shows a flowchart of an exemplary operation of entering a password. Before proceeding to the description of steps of this flowchart, a method of manually entering a password will be briefly described. If the password manual entry mode is entered, the LED 12 flashes on a predetermined cycle, and the number of times the LED 12 lights up before the password manual entry switch 9 is pressed is regarded as a password. For instance, if it is desired to enter a password "23", the switch 9 is turned ON after it is confirmed that the LED 12 has lit up twice, and then, the switch 9 is turned ON again after it is confirmed that the LED 12 has lit up three times.

A description will now be made with reference to the flowchart of FIG. 5. First of all, for example, a password manual entry end flag (not shown) in a non-volatile temporary storage portion (not shown) of the control portion 101 is cleared (step S21), and a shift to a password entry confirmation LED routine consisting of steps S22 to S28 is made. In this routine, the password is incremented by 1 every time a shift from a put-out state of the LED to a lit-up state of the LED is made. Namely, it is determined in step S22 whether the LED 12 has been lit up or put out. If the LED 12 has been lit up, a lit-up time is counted in steps S23 to S25. If a predetermined lit-up time is exceeded, the LED 12 is put out and a timer count is cleared (set to 0). On the other hand, if the LED 12 has been put out in step S22, a put-out time is counted in steps S26 to S28. If a predetermined put-out time is exceeded, the LED 12 is lit up, the password is incremented by 1, and the timer count is cleared (set to 0).

If the switch 9 is then turned ON (step S29) and the password is not 0 (step S30), the current password is saved in the non-volatile temporary storage portion of the control portion 101, and the digit of the password is incremented by 1 (step S31). If a value obtained by incrementing the password digit by 1 becomes equal to or greater than a predetermined digit for the password (step S32), the LED 12 is put out, the password manual entry end flag is set, and the operation of manually entering a password is finished (step S34). Otherwise the LED 12 is put out, both the password and the timer count are cleared (set to 0), and a subsequent digit is entered. The situation in which the password is entered is displayed or sounded out by the password manual entry situation output portion 117 and the informing unit 21 constructed as a display or audio equipment, and is visually or acoustically delivered to the driver.

Referring again to FIG. 4, the password thus entered is collated with the predetermined password 105c stored in the memory 105. If they coincide with each other (step S6), a starting control command is issued from the system power source output portion 109 to turn the system relay 5 ON (step S7). The engine control unit 3 and the actuator group 4 are thereby supplied with power. On the other hand, if those passwords do not coincide with each other, a return to step S1 is made without turning the system relay 5 ON.

If the system relay 5 is turned ON in step S7, the onboard unit 1 establishes communication with the engine control unit 3 via the communication line 13 by means of the wire communication portion 113. The onboard unit 1 then performs collation of ID's (which may include ciphers) using the ID data 105b for the engine control unit 3 which are stored in the memory 105 (step S8). If coincidence between the ID's is confirmed within a predetermined time (step S9), the system relay 5 is held ON. Thus, the supply of power to the engine control unit 3 and the actuator group 4 is maintained, the actuator group 4 is operated by, for example, being controlled by the engine control unit 3, and the engine is driven. This state is maintained until the engine is stopped (step S11). On the other hand, if coincidence between the ID's is not confirmed within the predetermined time in step S9, the system relay 5 is turned OFF (step S10), the supply of power to the engine control unit 3 and the actuator group 4 is stopped, and a return to step S1 is made.

A description will now be made as to the operation in the case where the operational switch 7 is turned ON in step S1. If the operational switch 7 is turned ON, the processing in the normal mode is performed and the onboard unit 1 establishes radio communication with the portable unit 2 carried by the driver by means of the radio communication portion 107. The onboard unit 1 then performs collation of ID's (which may include ciphers) using the ID data 105a for the portable unit 2 which are stored in the memory 105 (step S12). If they do not coincide with each other, a return to step S1 is made. If they do, a starting control command is issued from the system power source output portion 109 to turn the system relay 5 ON (step S13). The engine control unit 3 and the actuator group 4 are thereby supplied with power.

The following procedure is similar to steps S8 to S11. If the system relay 5 is turned ON in step S13, the onboard unit 1 establishes communication with the engine control unit 3 via the communication line 13 by means of the wire communication portion 113. The onboard unit 1 then performs collation of ID's (which may include ciphers) using the ID data 105b for the engine control unit 3 which are stored in the memory 105 (step S14). If coincidence between the ID's is confirmed within a predetermined time (step S15), the system relay 5 is held ON. Thus, the supply of power to the engine control unit 3 and the actuator group 4 is maintained, the actuator group 4 is operated by, for example, being controlled by the engine control unit 3, and the engine is driven. This state is maintained until the engine is stopped (step S17). On the other hand, if coincidence between the ID's is not confirmed within the predetermined time in step S15, the system relay 5 is turned OFF (step S16), the supply of power to the engine control unit 3 and the actuator group 4 is stopped, and a return to step S1 is made.

Figure 6:
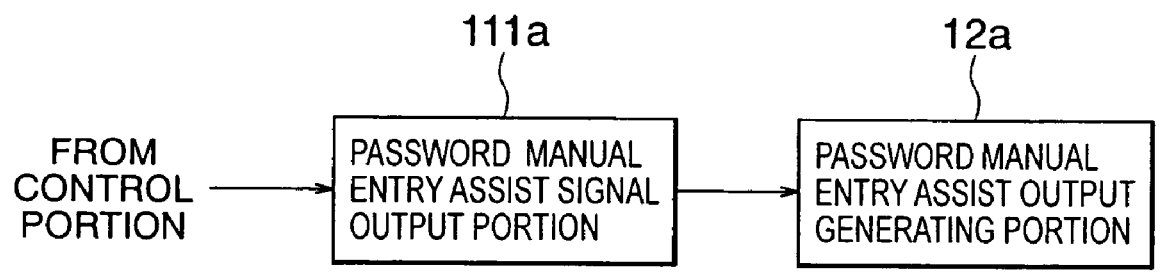
FIG. 6 is a diagram for explaining a modification example of the present invention.

Although the LED 12 that emits light is used as the password manual entry assist output generating section, it is also appropriate to use a component which generates sound at a predetermined frequency or the like instead. Accordingly, the part consisting of the LED output portion 111, the diode 11, and the LED 12 as illustrated in FIG. 1 may be replaced with the password manual entry assist signal output portion 111*a* and the password manual entry assist output generating portion 12*a* that generates light, sound, or the like as illustrated in FIG. 6.

If the aforementioned construction is adopted, connection of the coupler alone does not make it possible to enter a password, and the lack of the one and only mechanical key possessed by a user such as the driver prohibits the password manual entry mode from being entered. Therefore, an improvement is achieved in terms of security. Further, in order to manually enter a password, it is required that a predetermined normal voltage set by the signal voltage setting circuit be input by turning the key cylinder to its normal position. The signal voltage setting circuit is formed to range from the onboard unit to the key cylinder (mechanical key mechanism), and part of the signal voltage setting circuit is formed in the key cylinder. Therefore, if the signal voltage setting circuit in the key cylinder is destroyed when the key cylinder is destroyed, the normal voltage cannot be obtained, which makes it impossible to manually enter a password. Thus, an appreciable improvement has been achieved in terms of security.

What is claimed is:

1. A vehicle antitheft device, comprising a portable unit and an onboard unit for performing an authentication processing through radio communication between the portable unit and the onboard unit and issuing a starting control command to a side of a vehicle drive control unit upon fulfillment of authentication,
    wherein with a view to starting the vehicle without using the portable unit, the onboard unit comprises:
    wiring conductiveness detecting section for detecting that terminals of a predetermined electric wiring outside the onboard unit have been connected and made conductive by a connecting element;
    mechanical key position detecting section for detecting a predetermined signal from a mechanical key mechanism outside the onboard unit, the mechanical key mechanism generating the predetermined signal when a mechanical key has been inserted into a key cylinder and assumes a predetermined position;
    password detecting section for detecting a signal generated through operation of a password manual entry switch outside the onboard unit; and
    starting control command generating section for generating a starting control command to the side of the vehicle drive control unit when a predetermined password is entered after conductiveness of the predetermined electric wiring and occupation of the predetermined position by the mechanical key have been detected as a result of detection carried out by said wiring conductiveness detecting section, said mechanical key position detecting section, and said password detecting section.

2. A vehicle antitheft device according to claim 1, further comprising:
    a signal voltage setting circuit formed to range from the onboard unit to the mechanical key mechanism and designed to set a voltage of a signal that is generated when the mechanical key is at a predetermined position.

3. A vehicle antitheft device according to claim 1, further comprising:
    password manual entry assist output generating section for optically or acoustically generating a password manual entry assist output at a predetermined frequency for an operator of the password manual entry switch,
    wherein said starting control command generating section makes a determination on a password that has been entered based on a signal generated through operation of the password manual entry switch in response to the password manual entry assist output.

4. A vehicle antitheft device according to claim 1, further comprising:
    password manual entry situation informing section for providing information on a situation in which a password is manually entered.

5. A vehicle antitheft device according to claim 1,
    wherein the predetermined electric wiring is provided in a connector having the terminals, and
    wherein the connecting element is constructed as a coupler that electrically connects the terminals by being coupled to the connector.

6. A vehicle antitheft device according to claim 1,
    wherein the mechanical key mechanism also performs a locking function, and
    wherein the predetermined electric wiring is provided in a space locked and protected by the mechanical key mechanism.

7. The vehicle antitheft device according to claim 3, wherein said password manual entry assist output generating section only acoustically generates the password manual entry assist output at the predetermined frequency for the operator of the password manual entry switch.

* * * * *